United States Patent [19]
Dent

[11] Patent Number: 5,060,266
[45] Date of Patent: Oct. 22, 1991

[54] CONTINUOUS CIPHER SYNCHRONIZATION FOR CELLULAR COMMUNICATION SYSTEM

[75] Inventor: Paul Dent, Stehag, Sweden

[73] Assignee: Ericsson GE Mobile Communications Holding Inc., Paramus, N.J.

[21] Appl. No.: 556,102

[22] Filed: Jul. 20, 1990

[30] Foreign Application Priority Data

Mar. 7, 1990 [SE] Sweden ............................ 9000801

[51] Int. Cl.$^5$ .............................................. H04L 9/02
[52] U.S. Cl. ........................................ 380/49; 380/50; 379/59; 455/33
[58] Field of Search ................... 380/21, 23, 28, 43, 380/44, 46, 47, 48, 49, 50; 455/33; 375/107, 110, 112; 370/103, 105, 107; 379/59, 60

[56] References Cited

U.S. PATENT DOCUMENTS

| | | | |
|---|---|---|---|
| 3,934,078 | 1/1976 | Gannett | 178/22 |
| 4,133,974 | 1/1979 | Morgan | 380/46 |
| 4,304,962 | 12/1981 | Fracassi et al. | 380/46 X |
| 4,316,055 | 2/1982 | Feistel | 380/46 |
| 4,549,308 | 10/1985 | LoPinto | 455/26 |
| 4,555,805 | 11/1985 | Talbot | 455/26 |
| 4,649,543 | 3/1987 | Levine | 371/41 |
| 4,731,840 | 3/1988 | Mniszewski et al. | 380/21 |
| 4,754,481 | 6/1988 | Feggeler | 380/41 |
| 4,803,726 | 2/1989 | Levine et al. | 380/48 |
| 4,811,394 | 3/1989 | Ragavan et al. | 380/21 |
| 4,827,507 | 5/1989 | Marry et al. | 380/38 |
| 4,860,353 | 8/1989 | Brown | 380/44 |
| 4,876,740 | 10/1989 | Levine et al. | 455/33 |
| 4,896,370 | 1/1990 | Kasparian et al. | 455/77 |
| 4,914,696 | 4/1990 | Dudczak et al. | 380/21 |
| 4,924,480 | 5/1990 | Gay et al. | 375/8 |
| 4,926,665 | 5/1990 | Stapley et al. | 370/277 |

Primary Examiner—Thomas H. Tarcza
Assistant Examiner—Tod Swann
Attorney, Agent, or Firm—Johnson & Gibbs

[57] ABSTRACT

A system for the synchronization of encryption devices in a digital cellular communications system. Each of the encryption devices includes a multi-bit counter and generates a pseudo-random keystream which is combined with the data to be encrypted. The keystream is a function of the multi-bit counter value which is periodically incremented in response to a series of clock pulses. To allow proper decryption of the encrypted data, the system of the present invention provides continuous or very frequent updates of the transmitter counter value which may be used to reset the receiver counter and to resynchronize the system without the necessity of reinitialization and repetition of the intervening clock pulses.

58 Claims, 5 Drawing Sheets

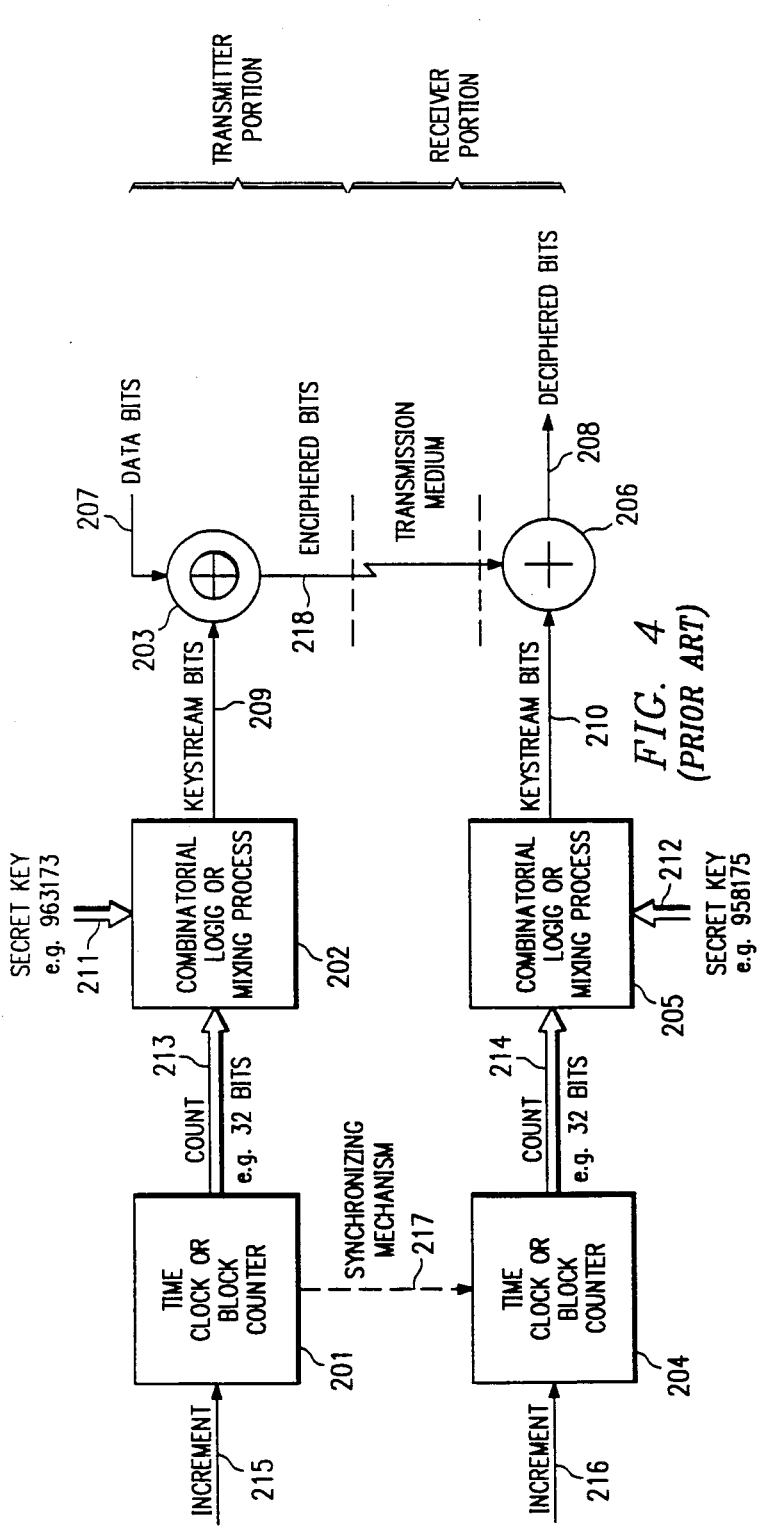
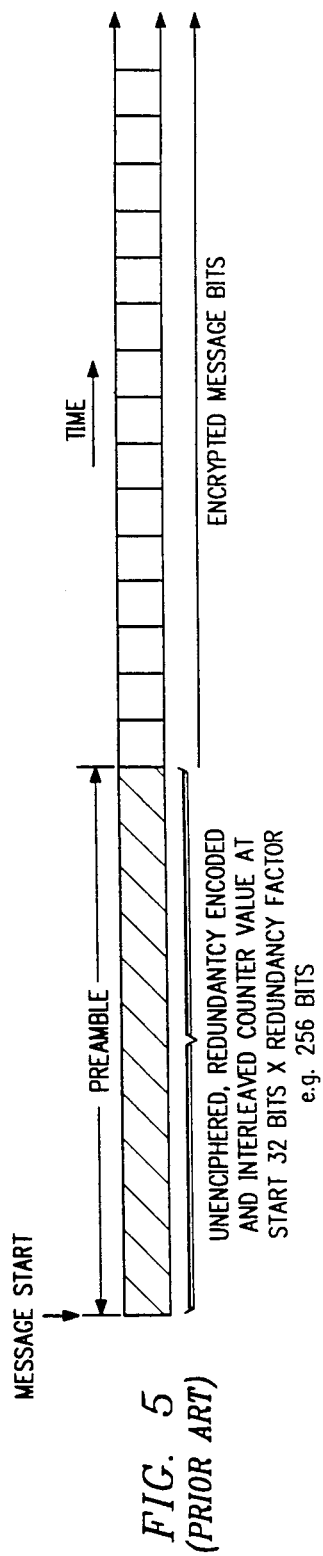
FIG. 4 (PRIOR ART)
FIG. 5 (PRIOR ART)

CONTINUOUS CIPHER SYNCHRONIZATION FOR CELLULAR COMMUNICATION SYSTEM

CROSS REFERENCE TO RELATED APPLICATIONS

This application contains subject matter related to co-pending U.S. patent application Ser. No. 556,358, entitled "Encryption System for Digital Cellular Communication", and also to co-pending U.S. patent application Ser. No. 556,103, entitled "Resynchronization of Encryption Systems upon Handoff", both of which were filed on even date herewith and assigned to the assignee of the present invention. Such applications and the disclosures therein are hereby incorporated by reference herein.

BACKGROUND OF THE INVENTION

1. Field of the Invention

The present invention relates to digital cellular communication systems, and more particularly, to a method and apparatus for the encryption of data communications within such a system.

2. History of the Prior Art

Cellular radio communications is, perhaps, the fastest growing field in the world-wide telecommunications industry. Although cellular radio communication systems comprise only a small fraction of the telecommunications systems presently in operation, it is widely believed that this fraction will steadily increase and will represent a major portion of the entire telecommunications market in the not too distant future. This belief is grounded in the inherent limitations of conventional telephone communications networks which rely primarily on wire technology to connect subscribers within the network. A standard household or office telephone, for example, is connected to a wall outlet, or phone jack, by a telephone cord of a certain maximum length. Similarly, wires connect the telephone outlet with a local switching office of the telephone company. A telephone user's movement is thus restricted not only by the length of the telephone cord, but also by the availability of an operative telephone outlet, i.e. an outlet which has been connected with the local switching office. Indeed, the genesis of cellular radio systems can be attributed, in large part, to the desire to overcome these restrictions and to afford the telephone user the freedom to move about or to travel away from his home or office without sacrificing his ability to communicate effectively with others. In a typical cellular radio system, the user, or the user's vehicle, carries a relatively small, wireless device which communicates with a base station and connects the user to other mobile stations in the system and to landline parties in the public switched telephone network (PSTN).

A significant disadvantage of existing cellular radio communication systems is the ease with which analog radio transmissions may be intercepted. In particular, some or all of the communications between the mobile station and the base station may be monitored, without authorization, simply by tuning an appropriate electronic receiver to the frequency or frequencies of the communications. Hence, anyone with access to such a receiver and an interest in eavesdropping can violate the privacy of the communications virtually at will and with total impunity. While there have been efforts to make electronic eavesdropping illegal, the clandestine nature of such activities generally means that most, if not all, instances of eavesdropping will go undetected and, therefore, unpunished and undeterred. The possibility that a competitor or a foe may decide to "tune in" to one's seemingly private telephone conversations has heretofore hindered the proliferation of cellular radio communication systems and, left unchecked, will continue to threaten the viability of such systems for businesses and government applications.

It has recently become clear that the cellular radio telecommunications systems of the future will be implemented using digital rather than analog technology. The switch to digital is dictated, primarily, by considerations relating to system speed and capacity. A single analog, or voice, radio frequency (RF) channel can accommodate four (4) to six (6) digital, or data, RF channels. Thus, by digitizing speech prior to transmission over the voice channel, the channel capacity and, consequently the overall system capacity, may be increased dramatically without increasing the bandwidth of the voice channel. As a corollary, the system is able to handle a substantially greater number of mobile stations at a significantly lower cost.

Although the switch from analog to digital cellular radio systems ameliorates somewhat the likelihood of breeches in the security of communications between the base station and the mobile station, the risk of electronic eavesdropping is far from eliminated. A digital receiver may be constructed which is capable of decoding the digital signals and generating the original speech. The hardware may be more complicated and the undertaking more expensive than in the case of analog transmission, but the possibility persists that highly personal or sensitive conversations in a digital cellular radio system may be monitored by a third party and potentially used to the detriment of the system users. Moreover, the very possibility of a third party eavesdropping on a telephone conversation automatically precludes the use of cellular telecommunications in certain government applications. Certain business uses may be equally sensitive to the possibility of a security breech. Thus, to render cellular systems as viable alternatives to the conventional wireline networks, security of communications must be available on at least some circuits.

Once a decision has been made to protect the transmission of digital information (data) from unauthorized access, the originator (sender) and the intended recipient (receiver) of the data must agree on a secret mechanism for enciphering (encrypting) and deciphering (decrypting) the information. Such an agreement usually involves a mutual commitment to use a particular encryption device which may be widely available, but which can be programmed with a secret key specific to the sender and receiver. The agreement, however, must also include choices with respect to the encryption technique and the method of synchronization to be used by the encryption device.

Several encryption techniques are known and implemented by prior art encryption devices. In one such technique, known as "block substitution", the secret key bits are mixed with blocks of data bits to produce blocks of encrypted data. With block substitution, blocks of data bits which differ merely by a single bit produce encrypted data blocks which differ, on the average, in one half (½) of their bit positions, and vice versa. Similarly, encrypted data blocks differing only in one bit position will produce decrypted data blocks differing, on the average, in one half (½) of their bit positions. This type of encryption/decryption tends to magnify the effects of bit errors which may occur upon transmission of the encrypted data and, therefore, is not an appropriate technique for use in digital radio communications.

Another known encryption technique relies on a keystream generator and modular arithmetic or finite math. A plurality of secret key bits and a series of clock pulses are applied to the keystream generator which generates a stream of pseudo-random bits referred to as a keystream. The keystream bits are then bit-by-bit modulo-2 added to the data bits prior to transmission by the sender. An identical keystream generator is used by the receiver to produce an identical keystream of bits which are then bit-by-bit modulo-2 subtracted from the received encrypted data stream to recover the original data. Proper implementation of this technique requires that the sender and receiver keystream generators be synchronized so that the keystream generated at the receiver and subtracted from the encrypted data is in harmony with the keystream generated at the sender and added to the original data.

An encryption technique which generates a large number of complex keystream bits and which may be implemented in a general purpose Arithmetic and Logic Unit (ALU) is disclosed in co-pending U.S. patent application Ser. No. 556,358, entitled "Encryption System For Digital Cellular Communication", and referred to above. The present invention is directed to a method and apparatus for synchronizing the encryption and decryption of data transmitted over a communications link such as an RF channel in a digital cellular communications system.

A variety of approaches to the issue of synchronization may be found in prior art encryption systems. In most encryption systems, synchronization may be viewed as an agreement between the sender and the receiver on the number of clock pulses to be applied from a common initial state until the generation of a particular bit. Other prior art encryption systems, however, do not keep a running count of the number of applied clock pulses and rely, instead, on the initialization of the sender and receiver to the same state at the beginning of a frame and the application of an identical number of clock pulses thereafter. The shortcoming of the latter scheme is the difficulty of reestablishing synchronization should the sender and receiver fall out of synchronization during a particular frame.

Yet another type of encryption system includes a counter which maintains a count of the number of keystream bits, or blocks of keystream bits, previously generated. The output bits of the counter are combined with the secret key bits to generate the keystream. Because the transmitter and receiver counters are incremented on a regular basis and, therefore, take on the characteristics of a digital time/date clock, such an encryption system is often referred to as a time-of-day driven encryption system.

The advantage of the time-of-day driven encryption system resides in the fact that if the receiver counter falls out of synchronization with the transmitter counter and the system has the capability of providing the receiver with the current transmitter counter value, the receiver counter may be immediately reset to the transmitter counter value instead of returning to the beginning and applying the entire history of clock pulses. The difficulty with such a system, however, is the provision of the transmitter counter value on a sufficiently frequent basis to avoid the accumulation of errors caused by the divergence of the receiver counter value from the transmitter counter value for a relatively long period of time. The present invention prevents such accumulation of errors by providing continuous or very frequent updates of the transmitter counter value which may be used to reset the receiver counter and to resynchronize the system without the necessity of reinitialization and repetition of the intervening clock pulses.

SUMMARY OF THE INVENTION

In one aspect of the invention there is included a method of communicating cryptographically encoded data within a digital telecommunications system in which a first pseudo-random key stream of bits is generated in accordance with an algorithm that is a function of a multi-bit digital value contained in a first register. The value contained in the first register is incremented at regular periodic intervals to vary the pattern of bits in the first key stream. The bits of the first pseudo-random key stream are combined with a stream of data bits carrying communications information to cryptographically encode the data and the encoded data is transmitted to a receiver. Also transmitted to the receiver at regular periodic intervals and interspersed with the transmissions of encoded data is the value contained in said first register. A second pseudo-random key stream of bits is generated in accordance with the algorithm which is a function of a multi-bit digital value contained in a second register. The value contained in the second register is incremented at the same regular periodic intervals as the first register to vary the pattern of bits in the second key stream in an identical fashion to the pattern of bits in the first key stream. The bits of the second pseudo-random key stream are combined with the received stream of cryptographically encoded data to decode the data into the communications information and the value contained in the second register is periodically compared with the received value of the first register to determine whether the two values match for corresponding moments of time and whether the first and second key streams are in synchronism with one another. In a related aspect, the value contained in the second register is reset with the received value of the first register for a corresponding moment in time when the values have become different to resynchronize the first and second key streams with one another.

In another aspect of the invention there is included a method for duplex communication of cryptographically encoded data within a digital telecommunications system. In this aspect a first pseudo-random key stream of bits is generated at a first location in accordance with an algorithm which is a function of a multi-bit digital value contained in a first register. The value contained in said first register is incremented at regular periodic intervals to vary the pattern of bits in the first key stream. The bits of the first pseudo-random key stream is combined with a stream of data bits carrying communications information to be sent from the first location to a second location to cryptographically encode the data stream and with a stream of cryptographically encoded data stream received from the second location. The data stream encoded at the first location is transmitted to a receiver at the second location along with the value contained in the first register which is sent at regular periodic intervals and interspersed with the transmissions of encoded data. A second pseudo-random key stream of bits which is a function of a multi-bit digital value contained in the second register is generated in accordance with the algorithm. The value contained in the second register is incremented at the same regular periodic intervals as the first register to vary the pattern of bits in the second key stream in an identical fashion to the pattern of bits in the first key stream. The bits of the second pseudo-random key stream are combined with the stream of cryptographically encoded data received at the second location to decode the data into the communications information and with a stream of data bit carrying communications information to be sent from the second location to the first location to cryptographically encode the data stream. The data stream encoded at the second location is transmitted to a receiver at the first location and the value contained in the second register is periodically compared with the received value of the first register to determine whether the two values correspond for corresponding moments of time and whether the first and second key streams are in synchronism with one another.

BRIEF DESCRIPTION OF THE DRAWINGS

The present invention will be better understood and its numerous objects and advantages will become apparent to those skilled in the art by reference to the following drawings in which:

FIG. 4 is a schematic block diagram of a prior art time-of-day driven encryption system;

FIG. 5 is a pictorial representation of a message format used by a known synchronization mechanism;

DETAILED DESCRIPTION OF THE PREFERRED EMBODIMENT

Figure 1:
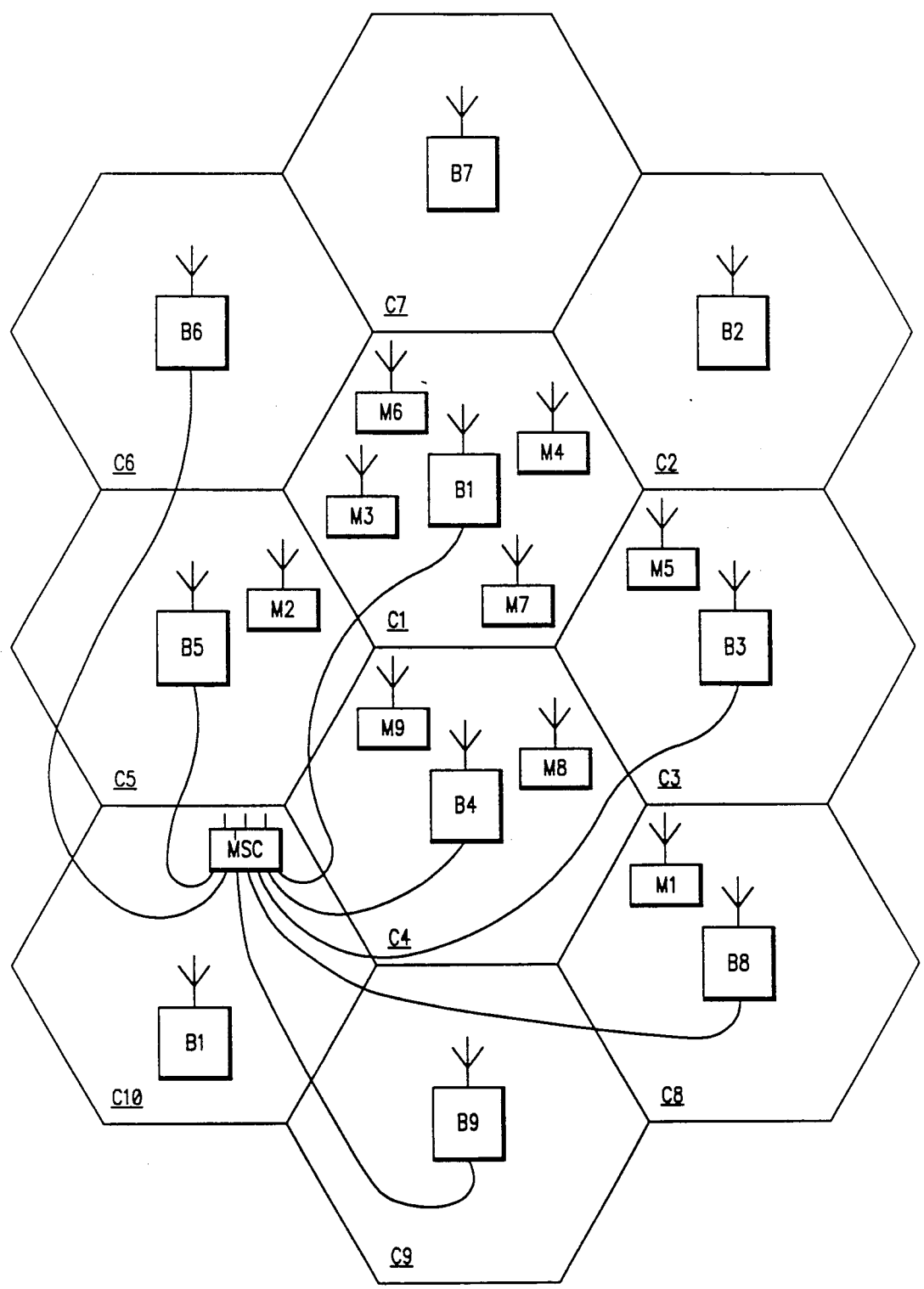
FIG. 1 is a pictorial representation of a cellular radio communications system including a mobile switching center, a plurality of base stations and a plurality of mobile stations.

Referring first to FIG. 1, there is illustrated therein a conventional cellular radio communications system of a type to which the present invention generally pertains. In FIG. 1, an arbitrary geographic area may be seen divided into a plurality of contiguous radio coverage areas, or cells, C1-C10. While the system of FIG. 1 is shown to include only 10 cells, it should be clearly understood that, in practice, the number of cells may be much larger.

Associated with and located within each of the cells C1-C10 is a base station designated as a corresponding one of a plurality of base stations B1-B10. Each of the base stations B1-B10 includes a transmitter, a receiver and controller as is well known in the art. In FIG. 1, the base stations B1-B10 are located at the center of the cells C1-C10, respectively, and are equipped with omni-directional antennas. However, in other configurations of the cellular radio system, the base stations B1-B10 may be located near the periphery, or otherwise away from the centers of the cells C1-C10 and may illuminate the cells C1-C10 with radio signals either omni-directionally or directionally. Therefore, the representation of the cellular radio system of FIG. 1 is for purposes of illustration only and is not intended as a limitation on the possible implementations of the cellular radio system.

With continuing reference to FIG. 1, a plurality of mobile stations M1-M10 may be found within the cells C1-C10. Again, only ten mobile stations are shown in FIG. 1 but it should be understood that the actual number of mobile stations may be much larger in practice and will invariably exceed the number of base stations. Moreover, while none of the mobile stations M1-M10 may be found in some of the cells C1-C10, the presence or absence of the mobile stations M1-M10 in any particular one of the cells C1-C10 should be understood to depend, in practice, on the individual desires of each of the mobile stations M1-M10 who may roam from one location in a cell to another or from one cell to an adjacent or neighboring cell.

Each of the mobile stations M1-M10 is capable of initiating or receiving a telephone call through one or more of the base stations B1-B10 and a mobile switching center MSC. The mobile switching center MSC is connected by communications links, e.g. cables, to each of the illustrative base stations B1-B10 and to the fixed public switching telephone network (PSTN), not shown, or a similar fixed network which may include an integrated system digital network (ISDN) facility. The relevant connections between the mobile switching center MSC and the base stations B1-B10, or between the mobile switching center MSC and the PSTN or ISDN, are not completely shown in FIG. 1 but are well known to those of ordinary skill in the art. Similarly, it is also known to include more than one mobile switching center in a cellular radio system and to connect each additional mobile switching center to a different group of base stations and to other mobile switching centers via cable or radio links.

Each of the cells C1-C10 is allocated a plurality of voice or speech channels and at least one access or control channel. The control channel is used to control or supervise the operation of mobile stations by means of information transmitted to and received from those units. Such information may include incoming call signals, outgoing call signals, page signals, page response signals, location registration signals, voice channel assignments, maintenance instructions and "handoff" instructions as a mobile station travels out of the radio coverage of one cell and into the radio coverage of another cell. The control or voice channels may operate either in an analog or a digital mode or a combination thereof. In the digital mode, analog messages, such as voice or control signals, are converted to digital signal representations prior to transmission over the RF channel. Purely data messages, such as those generated by computers or by digitized voice devices, may be formatted and transmitted directly over a digital channel.

In a cellular radio system using time division multiplexing (TDM), a plurality of digital channels may share a common RF channel. The RF channel is divided into a series of "time slots", each containing a burst of information from a different data source and separated by guard time from one another, and the time slots are grouped into "frames" as is well known in the art. The number of time slots per frame varies depending on the bandwidth of the digital channels sought to be accommodated by the RF channel. The frame may, for example, consist of three (3) time slots, each of which is allocated to a digital channel. Thus, the RF channel will accommodate three digital channels. In one embodiment of the present invention discussed herein, a frame is designated to comprise three time slots. However, the teachings of the present invention should be clearly understood to be equally applicable to a cellular radio system utilizing any number of time slots per frame.

Figure 2:
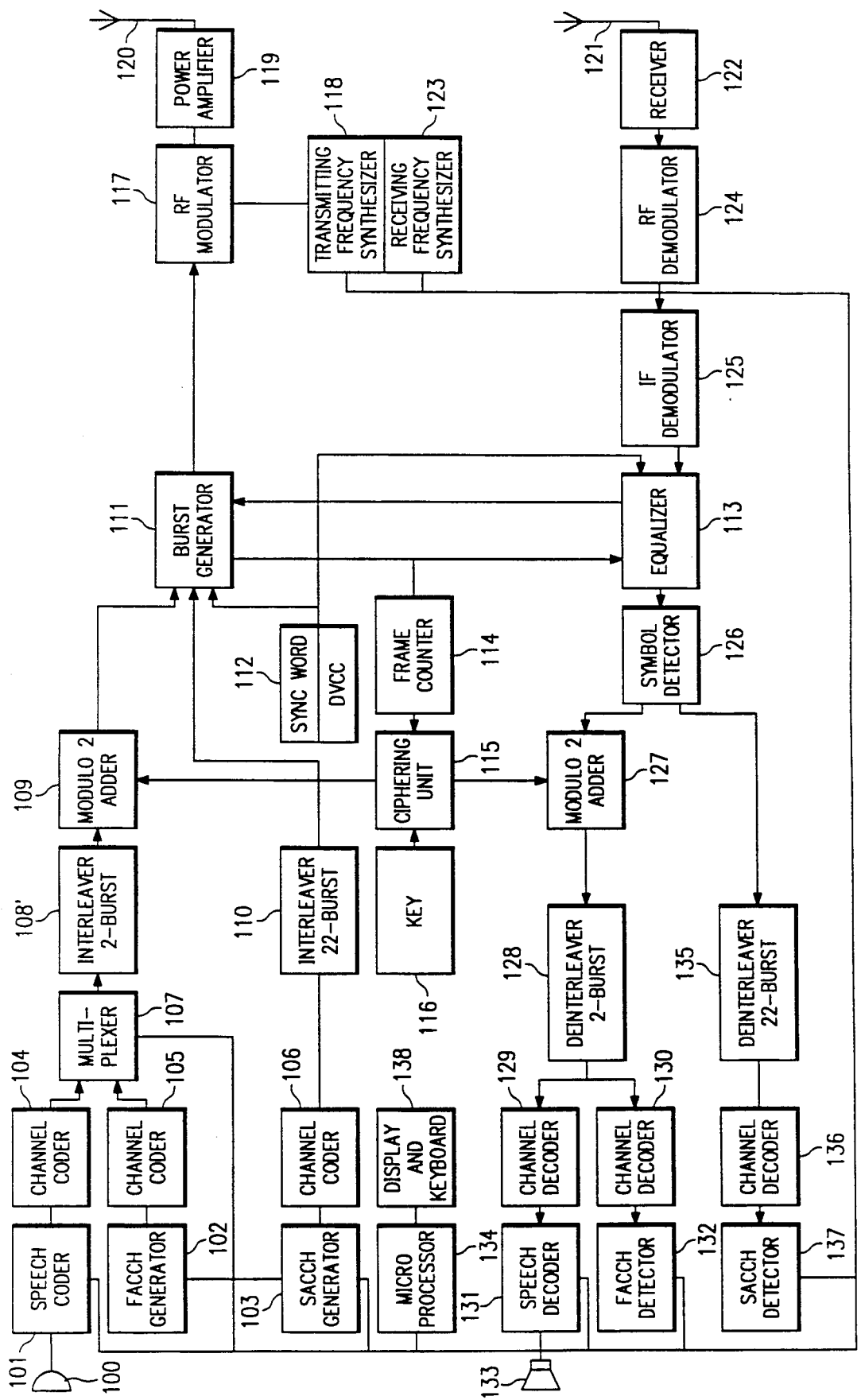
FIG. 2 is a schematic block diagram of mobile station equipment used in accordance with one embodiment of the system of the present invention.

Referring next to FIG. 2, there is shown therein a schematic block diagram of the mobile station equipment which are used in accordance with one embodiment of the present invention. The equipment illustrated in FIG. 2 may be used for communication over digital channels. A voice signal detected by a microphone 100 and destined for transmission by the mobile station is provided as input to a speech coder 101 which converts the analog voice signal into a digital data bit stream. The data bit stream is then divided into data packets or messages in accordance with the time division multiple access (TDMA) technique of digital communications. A fast associated control channel (FACCH) generator 102 exchanges control or supervisory messages with a base station in the cellular radio system. The conventional FACCH generator operates in a "blank and burst" fashion whereby a user frame of data is muted and the control message generated by the FACCH generator 102 is transmitted instead at a fast rate.

In contrast to the blank and burst operation of the FACCH generator 102, a slow associated control channel (SACCH) generator 103 continuously exchanges control messages with the base station. The output of the SACCH generator is assigned a fixed length byte, e.g. 12 bits, and included as a part of each time slot in the message train (frames). Channel coders 104, 105, 106 are connected to the speech coder 101, FACCH generator 102 and SACCH generator 103, respectively. Each of the channel coders 104, 105, 106 performs error detection and recovery by manipulating incoming data using the techniques of convolutional encoding, which protects important data bits in the speech code, and cyclic redundancy check (CRC), wherein the most significant bits in the speech coder frame, e.g., 12 bits, are used for computing a 7 bit error check.

Referring again to FIG. 2, the channel coders 104, 105 are connected to a multiplexer 107 which is used for time division multiplexing of the digitized voice messages with the FACCH supervisory messages. The output of the multiplexer 107 is coupled to a 2-burst interleaver 108 which divides each data message to be transmitted by the mobile station (for example, a message containing 260 bits) into two equal but separate parts (each part containing 130 bits) arranged in two consecutive time slots. In this manner, the deteriorative effects of Rayleigh fading may be significantly reduced. The output of the 2-burst interleaver 108 is provided as input to a modulo-2 adder 109 where the data to be transmitted is ciphered on a bit-by-bit basis by logical modulo-2 addition with a pseudo-random keystream which is generated in accordance with the system of the present invention described below.

The output of the channel coder 106 is provided as input to a 22-burst interleaver 110. The 22-burst interleaver 110 divides the SACCH data into 22 consecutive time slots, each occupied by a byte consisting of 12 bits of control information. The interleaved SACCH data forms one of the inputs to a burst generator 111. Another input to the burst generator 111 is provided by the output of the modulo-2 adder 109. The burst generator 111 produces "message bursts" of data, each consisting of a time slot identifier (TI), a digital voice color code (DVCC), control or supervisory information and the data to be transmitted, as further explained below.

Transmitted in each of the time slots in a frame is a time slot identifier (TI), which is used for time slot identification and receiver synchronization, and a digital voice color code (DVCC), which ensures that the proper RF channel is being decoded. In the exemplary frame of the present invention, a set of three different 28-bit TIs is defined, one for each time slot while an identical 8-bit DVCC is transmitted in each of the three time slots. The TI and DVCC are provided in the mobile station by a sync word/DVCC generator 112 connected to the burst generator 111 as shown in FIG. 2. The burst generator 111 combines the outputs of the modulo-2 adder 109, the 22-burst interleaver 110 and the sync word/DVCC generator 112 to produce a series of message bursts, each comprised of data (260 bits), SACCH information (12 bits), TI (28 bits), coded DVCC (12 bits) and 12 delimiter bits for a total of 324 bits which are integrated according to the time slot format specified by the EIA/TIA IS-54 standard.

Each of the message bursts is transmitted in one of the three time slots included in a frame as discussed hereinabove. The burst generator 111 is connected to an equalizer 113 which provides the timing needed to synchronize the transmission of one time slot with the transmission of the other two time slots. The equalizer 113 detects timing signals sent from the base station (master) to the mobile station (slave) and synchronizes the burst generator 111 accordingly. The equalizer 113 may also be used for checking the values of the TI and the DVCC. The burst generator 111 is also connected to a 20 ms frame counter 114 which is used to update a ciphering code that is applied by the mobile station every 20 ms, i.e., once for every transmitted frame. The ciphering code is generated by a ciphering unit 115 with the use of a mathematical algorithm and under the control of a key 116 which is unique to each mobile station. The algorithm may be used to generate a pseudo-random keystream in accordance with the present invention and as discussed further below.

The message bursts produced by the burst generator 110 are provided as input to an RF modulator 117. The RF modulator 117 is used for modulating a carrier frequency according to the /4-DQPSK technique (/4 shifted, differentially encoded quadrature phase shift key). The use of this technique implies that the information to be transmitted by the mobile station is differentially encoded, i.e., two bit symbols are transmitted as 4 possible changes in phase: + or −/4 and + or −3/3. The carrier frequency for the selected transmitting channel is supplied to the RF modulator 117 by a transmitting frequency synthesizer 118. The burst modulated carrier signal output of the RF modulator 117 is amplified by a power amplifier 119 and then transmitted to the base station through an antenna 120.

The mobile station receives burst modulated signals from the base station through an antenna 121 connected to a receiver 122. A receiver carrier frequency for the selected receiving channel is generated by a receiving frequency synthesizer 123 and supplied to a an RF demodulator 124. The RF demodulator 124 is used to demodulate the received carrier signal into an intermediate frequency signal. The intermediate frequency signal is then demodulated further by an IF demodulator 125 which recovers the original digital information as it existed prior to /4-DQPSK modulation. The digital information is then passed through the equalizer 113 to a symbol detector 126 which converts the two-bit symbol format of the digital data provided by the equalizer 114 to a single bit data stream.

The symbol detector 126 produces two distinct outputs: a first output, comprised of digitized speech data and FACCH data, and a second output, comprised of SACCH data. The first output is supplied to a modulo-2 adder 127 which is connected to a 2-burst deinterleaver 128. The modulo-2 adder 127 is connected to the ciphering unit 115 and is used to decipher the 4 encrypted transmitted data by subtracting on a bit-by-bit basis the same pseudo-random keystream used by the transmitter in the base station encrypt the data and which is generated in accordance with the teachings of the present invention set forth below. The modulo-2 adder 127 and the 2-burst deinterleaver 128 reconstruct the speech/FACCH data by assembling and rearranging information derived from two consecutive frames of the digital data. The 2-burst deinterleaver 128 is coupled to two channel decoders 129, 130 which decode the convolutionally encoded speech/FACCH data using the reverse process of coding and check the cyclic redundancy check (CRC) bits to determine if any error has occurred. The channel decoders 129, 130 detect distinctions between the speech data on the one hand, and any FACCH data on the other, and route the speech data and the FACCH data to a speech decoder 131 and an FACCH detector 132, respectively. The speech decoder 131 processes the speech data supplied by the channel decoder 129 in accordance with a speech coder algorithm, e.g. VSELP, and generates an analog signal representative of the speech signal transmitted by the base station and received by the mobile station. A filtering technique may then be used to enhance the quality of the analog signal prior to broadcast by a speaker 133. Any FACCH messages detected by the FACCH detector 132 are forwarded to a microprocessor 134.

The second output of the symbol detector 126 (SACCH data) is supplied to a 22-burst deinterleaver 135. The 22-burst interleaver 135 reassembles and rearranges the SACCH data which is spread over 22 consecutive frames. The output of the 22-burst deinterleaver 135 is provided as input to a channel decoder 136. FACCH messages are detected by an SACCH detector 137 and the control information is transferred to the microprocessor 134.

The microprocessor 134 controls the activities of the mobile station and communications between the mobile station and the base station. Decisions are made by the microprocessor 134 in accordance with messages received from the base station and measurements performed by the mobile station. The microprocessor 134 is also provided with a terminal keyboard input and display output unit 138. The keyboard and display unit 138 allows the mobile station user to exchange information with the base station.

Figure 3:
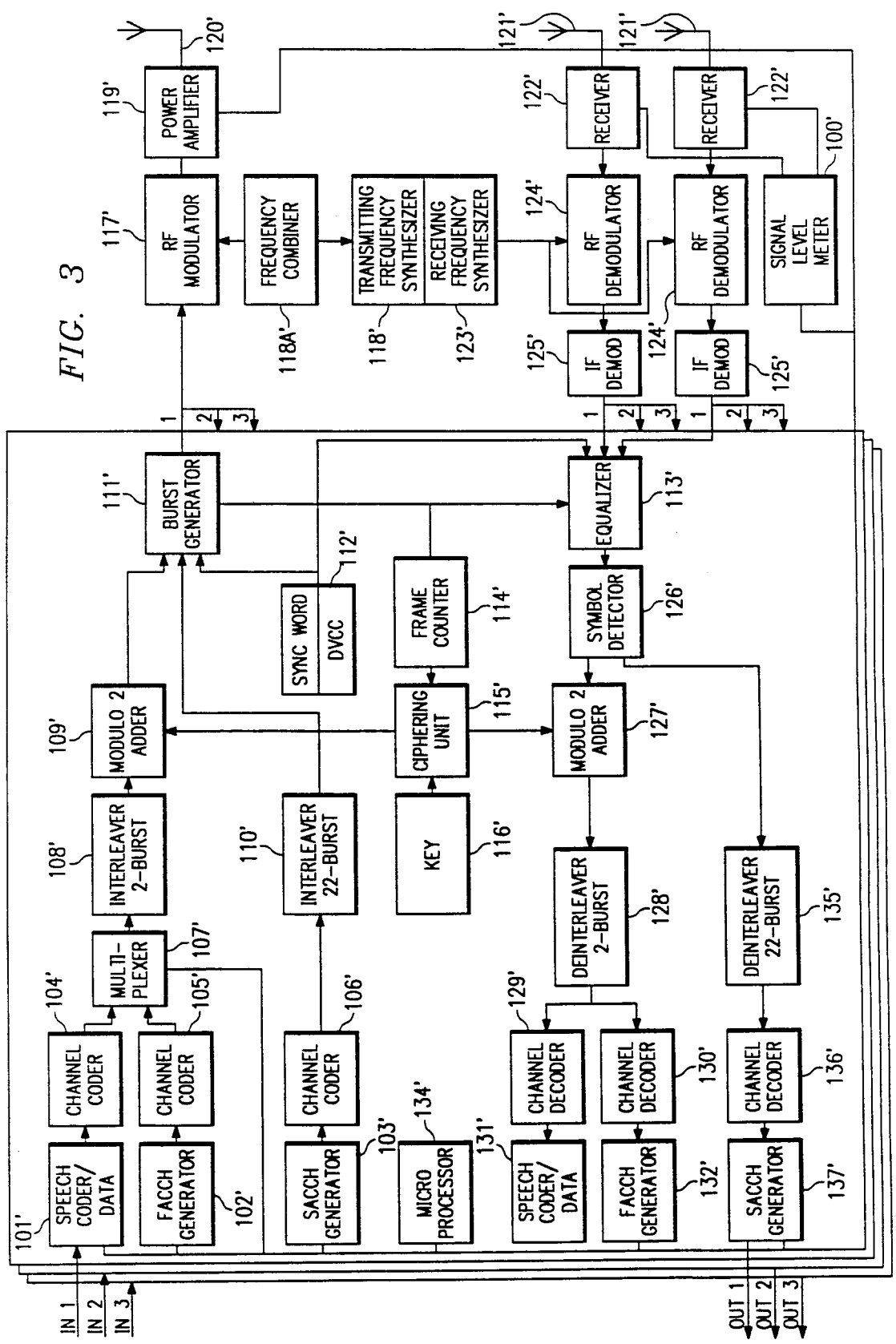
FIG. 3 is a schematic block diagram of base station equipment used in accordance with one embodiment of the system of the present invention.

Referring next to FIG. 3, there is shown a schematic block diagram of the base station equipment which are used in accordance with the present invention. A comparison of the mobile station equipment shown in FIG. 2 with the base station equipment shown in FIG. 3 demonstrates that much of the equipment used by the mobile station and the base station are substantially identical in construction and function. Such identical equipment are, for the sake of convenience and consistency, designated with the same reference numerals in FIG. 3 as those used in connection with FIG. 2, but are differentiated by the addition of a prime (') in FIG. 3.

There are, however, some minor differences between the mobile station and the base station equipment. For instance, the base station has, not just one but, two receiving antennas 121'. Associated with each of the receiving antennas 121' are a receiver 122', an RF demodulator 124', and an IF demodulator 125'. Furthermore, the base station includes a programmable frequency combiner 118A' which is connected to a transmitting frequency synthesizer 118'. The frequency combiner 118A' and the transmitting frequency synthesizer 118' carry out the selection of the RF channels to be used by the base station according to the applicable cellular frequency reuse plan. The base station, however, does not include a user keyboard and display unit similar to the user keyboard and display unit 138 present in the mobile station. It does however include a signal level meter 100' connected to measure the signal received from each of the two receivers 122' and to provide an output to the microprocessor 134'. Other differences in equipment between the mobile station the base station may exist which are well known in the art.

The discussion thus far has focused on the operational environment of the system of the present invention. A specific description of a particular embodiment of the present invention follows. As disclosed above and used hereinafter, the term "keystream" means a pseudo-random sequence of binary bits or blocks of bits used to encipher a digitally encoded message or data signal prior to transmission or storage in a medium which is susceptible to unauthorized access, e.g., an RF channel. A "keystream generator" means a device which generates a keystream by processing a secret key comprised of a plurality of bits. Encryption may be simply performed by a modulo-2 addition of the keystream to the data to be encrypted. Similarly, decryption is performed by a modulo-2 subtraction of an identical copy of the keystream from the encrypted data.

Generally speaking, the keystream generator provides a mechanism, represented by elements 115 and 115' of FIGS. 2 and 3, respectively, for expanding a relatively small number of secret bits, i.e., the secret key, represented by elements 116 and 116', into a much larger number of keystream bits which are then used to encrypt data messages prior to transmission (or storage). To decrypt an encoded message, the receiver must "know" the index to the keystream bits used to encrypt the message. In other words, the receiver must not only have the same keystream generator and generate the same keystream bits as the transmitter, but also, the receiver keystream generator must be operated in synchronism with the transmitter keystream generator if the message is to be properly decoded. Synchronization is normally achieved by transmitting from the encoding system to the decoding system the initial contents of every internal memory device, such as bit, block or message counters, which participate in the generation of the keystream bits. Synchronization may be simplified, however, by using arithmetic bit block counters, such as binary counters, and incrementing those counters by a certain amount each time a new block of keystream bits is produced. Such counters may form a part of a real-time, i.e. hours, minutes and seconds, clock chain. A keystream generator relying on the latter type of counters is known as the "time-of-day" driven keystream generator to which reference was made hereinabove.

Referring now to FIG. 4, a schematic block diagram of a prior art time-of-day driven encryption system may now be seen. The upper half of FIG. 4 represents the transmitter portion, and the lower half represents the receiver portion, of such an encryption system. In the transmitter portion, a time clock or block counter 201 generates a count 213, for example, a 32-bit output, in response to an increment 215 applied at the input of the time clock or block counter 201. The count 213 is provided as a first input to a combinatorial logic or mixing process 202. A secret key, for example, the value 968173 in binary notation, is provided as a second input 211 to the combinatorial logic or mixing process 202. With each occurrence of a new value for the count 213, the combinatorial logic or mixing process 202 combines or mixes the secret key 211 with the count 213 and generates a plurality of pseudo-random keystream bits at a serial or parallel output 209. The keystream output 209 is then provided as an input to a modulo-2 adder 203. The data to be encrypted forms a second input 207 to the modulo-2 adder 203. Each of the keystream bits is modulo-2 added to a particular data bit by the modulo-2 adder 203 and the encrypted data is supplied to output 218 for transmission through the medium.

In the receiver portion, a time clock or block counter 204, which is identical in construction to the time clock or block counter 201 and is provided with an increment 216 identical to the increment 215, supplies a count 214 to a combinatorial logic or mixing process 205, which is identical in construction to the combinatorial logic or mixing process 202. The combinatorial logic or mixing process 205 combines or mixes the count 214 with an identical secret key, i.e., 968173 in binary notation, which is provided at input 212, thereby producing a keystream at an output 210 which is identical to the keystream produced at the output 209. The keystream output 210 is bit-by-bit modulo-2 added to the encrypted data received over the transmission medium by a modulo-2 adder 206. Since modulo-2 addition and modulo-2 substraction are the same operation, the modulo-2 addition of the indentical keystream at the receiver cancels the previous addition of the keystream at the transmitter and results in the recovery of the original data at output 208. Note, however, that such cancellation and proper deciphering of the encrypted data will occur only if the time clocks or block counters 201, 204 are perfectly synchronized with one another. An appropriate synchronization mechanism 217 must be provided for this purpose.

Referring next to FIG. 5, there is shown therein a message format used by a known synchronization mechanism. The message format reflects the arrangement of data in each time slot (burst) of a frame. Immediately following the beginning of each message, i.e., after message start, all the state values (output bits) of the time clock or block counter 201, e.g., all 32 bits of the count 213, are transmitted as a preamble to a sequence of encrypted message bits. To avoid transmission errors which could cripple synchronization, the count bits are preferably redundantly encoded using a powerful error correction code and the coded bits interleaved within the transmitted signal to disperse the redundancy in time thereby increasing tolerance to burst errors. The coding of the count bits should expand the number of bits to be transmitted by a considerable factor, for example, a factor of eight (8), so as to provide the redundancy needed to attain close to a hundred percent (100%) probability of error-free transmission of the encoded count bits. Following the transmission of the redundantly encoded but unencrypted preamble, the encrypted message bits are transmitted over the transmission medium.

The synchronization mechanism illustrated in FIG. 5 may perhaps be adequate for communications over simplex channels, i.e., "press-to-talk" or "over/over" radiotelephony. If an "over" is missed due to faulty synchronization, the user can simply request a repeat of that transmission. By comparison, communications over duplex channels, i.e., normal bi-directional radiotelephony, typically do not switch directions in an "over/over" fashion and conversations, once established, frequently continue for a substantial period of time. If a duplex communications system has no means of establishing synchronization other than at the beginning of a call, a loss of synchronization during the call would result in a loss of the call forcing the user to reestablish communications by placing another call. In the context of a cellular radio system utilizing encryption/decryption devices, such a loss of synchronization would require the user to take some affirmative action, for example, to redial the desired telephone number. The present invention provides a method and apparatus which obviate the necessity and inconvenience of redial upon loss of synchronization and which provide frequent opportunities during an ongoing radio telephone conversation to quickly correct any loss of synchronization between the transmitter portion and the receiver portion described in connection with FIG. 4.

In the discussion of FIGS. 1–3, mention was made of the Slow Associated Control Channel (SACCH) which is used to convey a low rate data stream of management and control information between the mobile station and the base station and vise versa. The SACCH is often used by the mobile station for the transmission of signal strength information that allows the system to determine which of the surrounding base stations is best suited for maintaining contact with the mobile station. As discussed hereinbefore, the SACCH information bits are interleaved and multiplexed with the voice traffic bits prior to transmission. The present invention makes additional use of the SACCH to continuously broadcast the state of the time clock or block counter which, as previously described, controls the operation of the time-of-day or block-count driven encryption device. It should be clearly understood, however, that the teachings of the present invention encompass the use of any other low bit rate auxiliary channel which may be available in the system.

Figure 6:
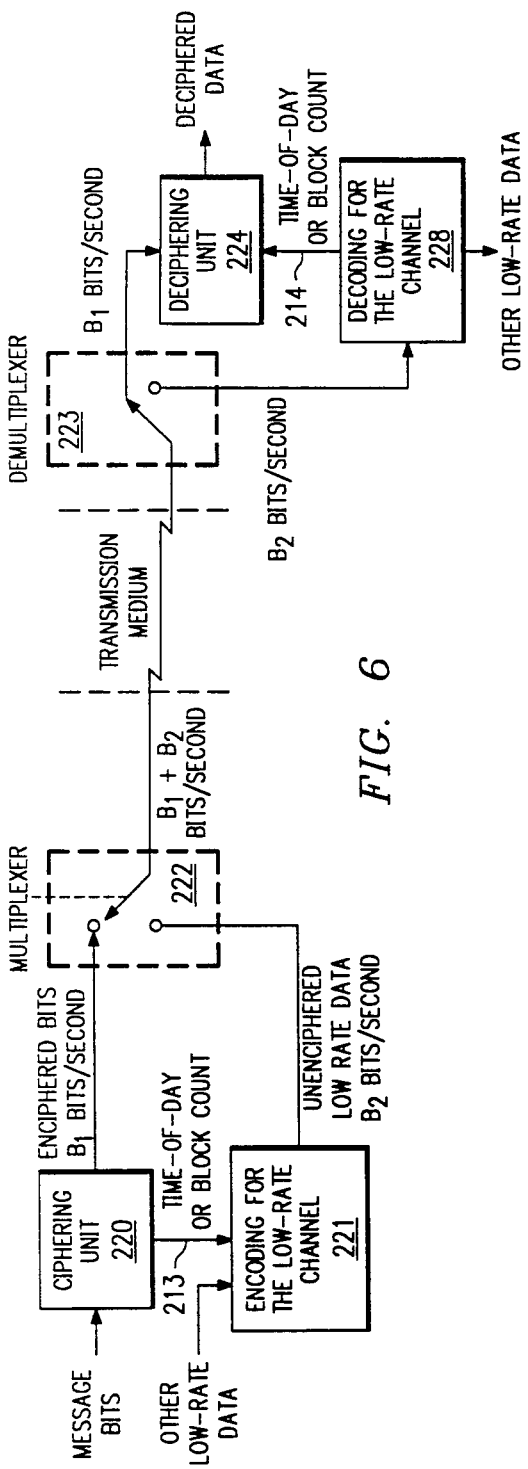
FIG. 6 is a schematic block diagram of a time-of-day or block-count driven encryption system which includes a synchronization mechanism constructed in accordance with the present invention.

Referring now to FIG. 6, there is shown therein a schematic block diagram of time-of-day or block-count driven encryption system, including a synchronization mechanism constructed in accordance with the present invention. A ciphering unit 220 at the transmitter, e.g., the transmitter portion in FIG. 5, converts a stream of message bits into a stream of enciphered bits for transmission at a mean data rate of $B_1$ bits/second. The ciphering unit 220 also provides a current time-of-day or block count, e.g., the count 213, to an auxiliary, low rate channel encoder 221. Depending on the extent of other low-rate data, the encoder 221 may include the encoded time-of-day or block count in an output stream generated at an average rate of $B_2$ bits/second. The auxiliary stream of B2 bits/second is then combined with the enciphered message stream of B1 bits/second by a multiplexer 222 to produce a stream of B1+B2 bits/second for transmission over the communications medium.

It should be recognized that other overhead bits, such as demodulator synchronization patterns or further redundancy of the data in the form of error correction coding, may be added prior to transmission of the stream of B1+B2 bits/second, but is not specifically shown in the simplified block diagram of FIG. 6. Moreover, the use of the burst transmission technique (discussed in connection with FIGS. 1-3) may result in a burst bit rate greater than B1+B2 bits/second over the transmission medium. Nevertheless, after performance of the inverse of such encoding processes at the receiver, an average bit rate of B1+B2 bits/second should once more emerge at the input to a demultiplexer 223 which divides the incoming stream of B1+B2 bits/second into an enciphered message stream of B1 bits/second and an encoded low-rate control stream of B2 bits/second. The B1 bits/second enciphered message stream is provided as input to a deciphering unit 24 (the receiver portion of FIG. 5) which generates a stream of deciphered data. The B2 bits/second control stream, on the other hand, is supplied to an auxiliary, low-rate channel decoder 228.

The auxiliary channel decoder 228 detects the receipt of any time-of-day or block count data which may have been transmitted by the encryption device and checks to determine whether such data was correctly received before resetting the decryption device. The error check is performed in order to avoid resetting the time clock or block counter at the receiver, e.g., the time clock or block counter 204, with a new time-of-day or block count which is inaccurate due to transmission errors. A correctly received time-of-day or block count is passed from the auxiliary channel decoder 228 to the deciphering unit 224 where the received count is used to verify and, if necessary, update the current count at the decryption device, e.g., the count 214 in FIG. 5.

The process of verifying and updating of the receiver block count includes a number of steps and safeguards. In particular, account must be taken of the transmission delays through the auxiliary channel. For example, as discussed in connection with FIGS. 1-3, the SACCH data is usually interleaved or spread over a plurality of consecutive message frames. Thus, for example, the transmitter block count value for a frame x at a specific moment of time is spread over y frames and transmitted in a series of frames, x, x+1, x+2, ..., x+y. The delay y, however, is a system-defined constant number which may be added at the receiver to the block count value derived from the frames x, x+1, x+2, ..., x+y and a current transmitter block count value obtained. The current transmitter block count value is then compared to the current receiver block count value and, in the event of divergence, the receiver block counter is reset to the value of the transmitter block counter for the corresponding moment of time.

Further error protection may be built into the method of resetting the receiver block count, in the event of disagreement with the transmitter block count, by imposing a more severe criterion for resetting the most significant bits, or for otherwise causing a drastic step change in the receiver count value. The latter may be achieved, for example, by using the technique of "majority vote" over several count transfers, after allowing for the known increment between times.

It will be appreciated from the foregoing description that the present invention provides a synchronization mechanism which may be used independently of the specific encryption and decryption technique used by the ciphering unit 220 and the deciphering unit 224, respectively. The encryption of data in the communications system may be performed by modulo-2 addition of the keystream to the data stream, by random transposition of the data, i.e., alteration of the order in which the data bits normally appear in the message format, or by a combination of these techniques without departing in the least from the teachings of the present invention as disclosed above and further described below.

In duplex communication applications, such as mobile radio telephony, the present invention, as heretofore illustrated and described, may be used independently in each direction. Specifically, the encryption device used for encrypting transmissions in one direction may include a time clock or block counter which is separate from, and possibly unrelated to, the time clock or block counter of the decryption device used for decrypting receptions in the other direction. Similarly, the auxiliary low-rate channel, which is used to periodically transfer the count state value in accordance with the present invention, is a duplex channel providing simultaneous, bi-directional communications. An advantageous alternative arrangement would rely on a single time-of-day or block-count driven keystream generator at each end of the communications link to produce a sufficient number of keystream bits for use both in enciphering data messages prior to transmission and in deciphering received data messages.

Assuming that the number of message bits in a transmitted or received block in either direction is the same, and equal to N, the keystream generator at one end of the communications link would produce, using the same secret key bits and block counts as in the case of two keystream generators, a first N keystream bits, A=(a1, a2, a3...aN), for enciphering transmitted messages and a second N keystream bits, B=(a(n+1), a (n+2)...a(2N)), for deciphering received messages. The use of the N-bit keystreams A, B for enciphering and deciphering, respectively, would then be reversed at the other end of the communications link. Hence, only one block count synchronization is necessary and this synchronization may be achieved using the low-rate auxiliary channel in one direction only.

As mentioned earlier, the chief function of the SACCH is to carry signal strength information from the mobile station to a base station in the land network. The SACCH in the opposite direction, i.e., base station to mobile station, exists mainly because of symmetry reasons and often lays idle. Consequently, it may be advantageous to designate the base station's time clock or block counter as the "master" and to periodically transmit the base station's count value in the frequently idle SACCH direction to the mobile station so as to provide continuous resynchronization in accordance with the foregoing description of the present invention. Should the need arise to transfer some other low-rate data over the SACCH in the direction of land network to mobile station, the other data may be accorded priority and transmission of the base station count value may be resumed thereafter. In this aspect of the present invention, transmission of the time-of-day or block count value may be considered to represent the default state of the SACCH channel in the direction of land network to mobile which is interrupted for the transmission of higher priority messages.

The N or 2N bits produced by a keystream generator with each new value of the associated time clock or block counter are used for enciphering or deciphering groups of N message data bits in one or both directions, respectively. Multiplexed with these N-bit message groups are additional bits forming the auxiliary low-rate channel, which may be used, inter alia, for cipher synchronization in accordance with the present invention. Several different patterns may be used for multiplexing the auxiliary channel bits with the message data bits. However, to minimize the amount of overhead bits which are added to blocks of data by the auxiliary low-rate bit stream, a multiplexing format as illustrated in FIG. 7 may be selected.

Figure 7:
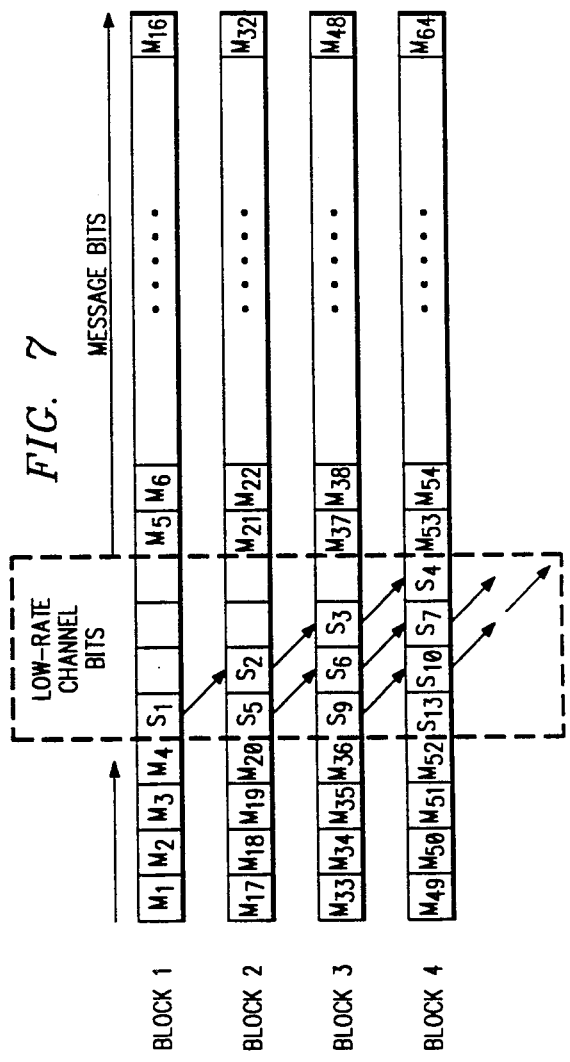
FIG. 7 is a pictorial representation of an exemplary multiplexing format which may be used in accordance with the present invention.

Referring now to FIG. 7, there is shown therein an exemplary multiplexing format which may be used in accordance with the present invention. FIG. 7 illustrates how a small number of low-rate channel bits, S1, S2, S3, S4 etc., may be included in each N-bit message group, the whole auxiliary message format only repeated over a number of such groups. Assuming that the auxiliary bit stream contains its own message start indicator code, the auxiliary message length does not necessarily need to be contained in an integral number of message groups. However, auxiliary message synchronization may be simplified if the auxiliary message length is deliberately aligned with an integral number of traffic message blocks.

FIG. 7 also illustrates how interleaving of the auxiliary bit streams over a number of message blocks may be used to disperse the burst errors that can arise if a whole message block, including auxiliary bits, is not correctly received. Where the decoder for the low-rate channel is equipped with error correction coding, the dispersal of such burst errors enables the decoder to easily detect and correct such errors.

The foregoing description shows only certain particular embodiments of the present invention. However, those skilled in the art will recognize that many modifications and variations may be made without departing substantially from the spirit and scope of the present invention. Accordingly, it should be clearly understood that the form of the invention described herein is exemplary only and is not intended as a limitation on the scope of the invention as defined in the following claims.

What is claimed is:

1. A method of communicating with cryptographically encoded data within a digital telecommunications system, comprising:
   generating a first pseudo-random key stream of bits in accordance with an algorithm which is a function of a multi-bit digital value contained in a first register;
   incrementing the value contained in said first register at defined intervals to vary the pattern of bits in the first key stream;
   combining the bits of the first pseudo-random key stream with a stream of data bits carrying communications information to cryptographically encode said data;
   transmitting said encoded data to a receiver;
   transmitting to said receiver at intervals and interspersed with said transmissions of encoded data the value contained in said first register;
   generating a second pseudo-random key stream of bits in accordance with said algorithm which is a function of a multi-bit digital value contained in a second register;
   incrementing the value contained in said second register at the same defined intervals as said first register to vary the pattern of bits in the second key stream in an identical fashion to the pattern of bits in the first key stream;
   combining the bits of the second pseudo-random key stream with the received stream of cryptographically encoded data to decode said data into said communications information; and
   periodically comparing the value contained in said second register with the received value of the first register to determine whether the two values correspond for corresponding moments of time and whether the first and second key streams are in synchronism with one another.

2. A method of communicating with cryptographically encoded data within a digital telecommunications system as set forth in claim 1 which also includes:
   resetting the value contained in said second register with the received value of the first register for a corresponding moment in time when the values have become different to resynchronize the first and second key streams with one another.

3. A method of communicating with cryptographically encoded data within a digital telecommunications systems as set forth in claim 1 in which:
   said step of transmitting to said receiver at intervals and interspersed with said transmissions of encoded data the value contained in said first register includes multiplexing said encoded data transmissions and said transmissions of first register values.

4. A method of communicating with cryptographically encoded data within a digital telecommunications system as set forth in claim 3 in which:
   said first register values are transmitted on a low bit rate auxiliary channel of a digital cellular communications stream.

5. A method of communicating with cryptographically encoded data within a digital telecommunications system as set forth in claim 4 wherein:
   said low bit rate auxiliary channel is a slow associated control channel.

6. A method of communicating with cryptographically encoded data within a digital telecommunications system as set forth in claim 4 wherein:
   said first register values are transmitted along with other low-rate data on said low bit rate auxiliary channel.

7. A method of communicating with cryptographically encoded data within a digital telecommunications system as set forth in claim 6 in which:
   transmission of said first register values are temporarily interrupted when it is necessary to transmit other data on said low bit rate auxiliary channel.

8. A method of communicating with cryptographically encoded data within a digital telecommunications system as set forth in claim 3 in which components of each of said first register values multiplexed with said encoded data transmissions are dispersed within several successive blocks of transmitted data.

9. A method of communicating with cryptographically encoded data within a digital telecommunications system as set forth in claim 1 in which:

said step of periodically comparing the value contained in said second register with the received value of the first register to determine whether two values correspond for corresponding moments of time and whether the first and second key streams are in synchronism with one another includes adding to the received value of the first register an incremental value to account for a time delay in transmission.

10. A method of communicating with cryptographically encoded data within a digital telecommunications system as set forth in claim 1 in which:

the bits of the first pseudo-random key stream are combined with said stream of data bits carrying communications information by modulo-2 addition; and the bits of the second pseudo-random key stream are combined with the received stream of cryptographically encoded data by modulo-2 subtraction.

11. A method of communicating with cryptographically encoded data within a digital telecommunications system as set forth in claim 1 in which:

the bits of the first pseudo-random key stream are combined with said stream of data bits carrying communications information to alter the order thereof; and the bits of the second pseudo-random key stream are combined with the received stream of cryptographically encoded data to restore the original order thereof.

12. A method of communicating with cryptographically encoded data within a digital telecommunications system as set forth in claim 1 in which the defined intervals with which the values contained in said first and second registers are incremented are regular and periodic.

13. A method of communicating with cryptographically encoded data within a digital telecommunications system as set forth in claim 1 in which the intervals with which the value contained in said first register are transmitted to said receiver are regular and periodic.

14. A method of communicating with cryptographically encoded data within a digital telecommunications system as set forth in claim 1 which includes the additional step of:

receiving a plurality of values of said first register successively transmitted to said receiver; and comparing said plurality of successively received first register values with one another after allowing for the increment of time between the transmission of each value to determine the accuracy of transmission of the received first register values before comparing said value to said second register value.

15. A system for communicating with cryptographically encoded data within a digital telecommunications system, comprising:

means for generating a first pseudo-random key stream of bits in accordance with an algorithm which is a function of a multi-bit digital value contained in a first register;

means for incrementing the value contained in said first register at defined intervals to vary the pattern of bits in the first key stream;

means for combining the bits of the first pseudo-random key stream with a stream of data bits carrying communications information to cryptographically encode said data;

means for transmitting said encoded data to a receiver;

means for transmitting to said receiver at intervals and interspersed with said transmissions of encoded data the value contained in said first register;

means for generating a second pseudo-random key stream of bits in accordance with said algorithm which is a function of a multi-bit digital value contained in a second register;

means for incrementing the value contained in said second register at the same defined intervals as said first register to vary the pattern of bits in the second key stream in an identical fashion to the pattern of bits in the first key stream;

means for combining the bits of the second pseudo-random key stream with the received stream of cryptographically encoded data to decode said data into said communications information; and means for periodically comparing the value contained in said second register with the received value of the first register to determine whether the two values correspond for corresponding moments of time and whether the first and second key streams are in synchronism with one another.

16. A system for communicating with cryptographically encoded data within a digital telecommunications system as set forth in claim 15 which also includes:

means for resetting the value contained in said second register with the received value of the first register for a corresponding moment in time when the values have become different to resynchronize the first and second key streams with one another.

17. A system for communicating with Cryptographically encoded data within a digital telecommunications system as set forth in claim 15 in which:

said means for transmitting to said receiver at intervals and interspersed with said transmissions of encoded data the value contained in said first register includes means for multiplexing said encoded data transmissions and said transmissions of first register values.

18. A system for communicating with cryptographically encoded data within a digital telecommunications system as set forth in claim 17 in which:

said first register values are transmitted on a low bit rate auxiliary channel of a digital cellular communications stream.

19. A system for communicating with cryptographically encoded data within a digital telecommunications system as set forth in claim 18 wherein:

said low bit rate auxiliary channel is a slow associated control channel.

20. A system for communicating with cryptographically encoded data within a digital telecommunications system as set forth in claim 18 wherein:

said first register values are transmitted along with other low-rate data on said low bit rate auxiliary channel.

21. A system for communicating with cryptographically encoded data within a digital telecommunications system as set forth in claim 20 which also includes:

means for temporarily interrupting transmission of said first register values when it is necessary to transmit other data on said low bit rate auxiliary channel.

22. A system for communicating with cryptographically encoded data within a digital telecommunications system as set forth in claim 15 in which:

said means for periodically comparing the value contained in said second register with the received value of the first register to determine whether two values correspond for corresponding moments of time and whether the first and second key streams are in synchronism with one another includes means for adding to the received value of the first register an incremental value to account for a time delay in transmission.

23. A system for communicating with cryptographically encoded data within a digital telecommunications system as set forth in claim 15 in which:
the bits of the first pseudo-random key stream are combined with said stream of data bits carrying communications information by modulo-2 addition; and
the bits of the second pseudo-random key stream are combined with the received stream of cryptographically encoded data by modulo-2 subtraction.

24. A system for communicating with cryptographically encoded data within a digital telecommunications system as set forth in claim 15 in which:
the bits of the first pseudo-random key stream are combined with said stream of data bits carrying communications information to alter the order thereof; and
the bits of the second pseudo-random key stream are combined with the received stream of cryptographically encoded data to restore the original order thereof.

25. A method for duplex communication with cryptographically encoded data within a digital telecommunications system, comprising:
generating at a first location a first pseudo-random key stream of bits in accordance with an algorithm which is a function of a multi-bit digital value contained in a first register;
incrementing the value contained in said first register at defined intervals to vary the pattern of bits in the first key stream;
combining the bits of the first pseudo-random key stream with a stream of data bits carrying communications information to be sent from said first location to a second location to cryptographically encode said data stream and with a stream of cryptographically encoded data stream received from said second location;
transmitting the data stream encoded at said first location to a receiver at said second location;
transmitting to said receiver at said second location at intervals and interspersed with said transmissions of encoded data the value contained in said first register;
generating a second pseudo-random key stream of bits in accordance with said algorithm which is a function of a multi-bit digital value contained in a second register;
incrementing the value contained in said second register at the same defined intervals as said first register to vary the pattern of bits in the second key stream in an identical fashion to the pattern of bits in the first key stream;
combining the bits of the second pseudo-random key stream with the stream of cryptographically encoded data received at said second location to decode said data into said communications information and with a stream of data bits carrying communications information to be sent from said second location to said first location to cryptographically encode said data stream;
transmitting the data stream encoded at the second location to a receiver at the first location;
periodically comparing the value contained in said second register with the received value of the first register to determine whether the two values correspond for corresponding moments of time and whether the first and second key streams are in synchronism with one another.

26. A method for duplex communication with cryptographically encoded data within a digital telecommunications system as set forth in claim 25 which also includes:
resetting the value contained in said second register with the received value of the first register for a corresponding moment in time when the values have become different to resynchronize the first and second key streams with one another.

27. A method for duplex communication with cryptographically encoded data within a digital telecommunications system as set forth in claim 25 in which:
said step of transmitting to said receiver at intervals and interspersed with said transmissions of encoded data the value contained in said first register includes multiplexing said encoded data transmissions and said transmissions of first register values.

28. A method for duplex communication with cryptographically encoded data within a digital telecommunications system as set forth in claim 27 in which:
said first register values are transmitted on a low bit rate auxiliary channel of a digital cellular communications stream.

29. A method for duplex communication with cryptographically encoded data within a digital telecommunications system as set forth in claim 28 wherein:
said low bit rate auxiliary channel is a slow associated control channel.

30. A method for duplex communication with cryptographically encoded data within a digital telecommunications system as set forth in claim 28 wherein:
said first register values are transmitted along with other low-rate data on said low bit rate auxiliary channel.

31. A method for duplex communication with cryptographically encoded data within a digital telecommunications system as set forth in claim 30 in which:
transmission of said first register values are temporarily interrupted when it is necessary to transmit other data on said low bit rate auxiliary channel.

32. A method for duplex communication with cryptographically encoded data within a digital telecommunications system as set forth in claim 25 in which:
said step of periodically comparing the value contained in said second register with the received value of the first register to determine whether the two values correspond for corresponding moments of time and whether the first and second key streams are in synchronism with one another includes adding to the received value of the first register an incremental value to account for a time delay in transmission.

33. A method for duplex communication with cryptographically encoded data within a digital telecommunications system as set forth in claim 25 in which:
the bits of the first pseudo-random key stream are combined with said stream of data bits carrying communications information by modulo-2 addition; and the bits of the second pseudo-random key stream are combined with the received stream of cryptographically encoded data by modulo-2 subtraction.

34. A method of communicating with cryptographically encoded data within a digital telecommunications system as set forth in claim 25 in which the defined interval with which the values contained in said first and second registers are incremented are regular and periodic.

35. A method of communicating with cryptographically encoded data within a digital telecommunications system as set forth in claim 25 in which the interval with which the value contained in said first register are transmitted to said receiver are regular and periodic.

36. A system for duplex communication with cryptographically encoded data within a digital telecommunications system, comprising:

means for generating at a first location a first pseudo-random key stream of bits in accordance with an algorithm which is a function of a multi-bit digital value contained in a first register;

means for incrementing the value contained in said first register at defined intervals to vary the pattern of bits in the first key stream;

means for combining the bits of the first pseudo-random key stream with a stream of data bits carrying communications information to be sent from said first location to a second location to cryptographically encode said data stream and with a stream of cryptographically encoded data stream received from said second location;

means for transmitting the data stream encoded at said first location to a receiver at said second location;

means for transmitting to said receiver at said second location at intervals and interspersed with said transmissions of encoded data the value contained in said first register;

means for generating a second pseudo-random key stream of bits in accordance with said algorithm which is a function of a multi-bit digital value contained in a second register;

means for incrementing the value contained in said second register at the same defined intervals as said first register to vary the pattern of bits in the second key stream in an identical fashion to the pattern of bits in the first key stream;

means for combining the bits of the second pseudo-random key stream with the stream of cryptographically encoded data received at said second location to decode said data into said communications information and with a stream of data bit carrying communications information to be sent from said second location to said first location to cryptographically encode said data stream;

means for transmitting the data stream encoded at the second location to a receiver at the first location; and means for periodically comparing the value contained in said second register with the received value of the first register to determine whether the two values correspond for corresponding moments of time and whether the first and second key streams are in synchronism with one another.

37. A system for duplex communication with cryptographically encoded data within a digital telecommunications system as set forth in claim 36 which also includes:

means for resetting the value contained in said second register with the received value of the first register for a corresponding moment in time when the values have become different to resynchronize the first and second key streams with one another.

38. A system for duplex communication with cryptographically encoded data within a digital telecommunications system as set forth in claim 36 in which:

said step of transmitting to said receiver at interval and interspersed with said transmissions of encoded data the value contained in said first register includes multiplexing said encoded data transmissions and said transmissions of first register values.

39. A system for duplex communication with cryptographically encoded data within a digital telecommunications system as set forth in claim 38 in which:

said first register values are transmitted on a low bit rate auxiliary channel of a digital cellular communications stream.

40. A system for duplex communication with cryptographically encoded data within a digital telecommunications system as set forth in claim 39 wherein:

said low bit rate auxiliary channel is a slow associated control channel.

41. A system for duplex communication with cryptographically encoded data within a digital telecommunications system as set forth in claim 39 wherein:

said first register values are transmitted along with other low-rate data on said low bit rate auxiliary channel.

42. A system for duplex communication with cryptographically encoded data within a digital telecommunications system as set forth in claim 41 in which:

transmission of said first register values are temporarily interrupted when it is necessary to transmit other data on said low bit rate auxiliary channel.

43. A system for duplex communication with cryptographically encoded data within a digital telecommunications system as set forth in claim 36 in which:

said step of periodically comparing the value contained in said second register with the received value of the first register to determine whether the two values correspond for corresponding moments of time and whether the first and second key streams are in synchronism with one another includes adding to the received value of the first register an incremental value to account for a time delay in transmission.

44. A system for duplex communication with cryptographically encoded data within a digital telecommunications systems as set forth in claim 36 in which:

the bits of the first pseudo-random key stream are combined with said stream of data bits carrying communications information by modulo-2 addition; and the bits of the second pseudo-random key stream are combined with the received stream of cryptographically encoded data by modulo-2 subtraction.

45. A method of communicating with cryptographically encoded data within a digital telecommunications system as set forth in claim 36 in which the defined intervals with which the values contained in said first and second registers are incremented are regular and periodic.

46. A method of communicating with cryptographically encoded data within a digital telecommunications system as set forth in claim 36 in which the intervals with which the value contained in said first register are transmitted to said receiver are regular and periodic.

47. A method of communicating with cryptographically encoded data within a digital telecommunications system, comprising:

generating a first pseudo-random key stream of bits in accordance with an algorithm which is a function of a multi-bit digital value contained in a first register;

combining the bits of the first pseudo-random key stream with a stream of data bits carrying communications information to cryptographically encode said data;

transmitting said encoded data to a receiver;

transmitting to said receiver at intervals and interspersed with said transmissions of encoded data the value contained in said first register;

generating a second pseudo-random key stream of bits in accordance with said algorithm which is a function of a multi-bit digital value contained in a second register;

combining the bits of the second pseudo-random key stream with the received stream of cryptographically encoded data to decode said data into said communications information; and periodically comparing the value contained in said second register with the received value of the first register to determine whether the two values correspond for corresponding moments of time and whether the first and second key streams are in synchronism with one another.

48. A method of communicating with cryptographically encoded data within a digital telecommunications system as set forth in claim 47 which also includes:

resetting the value contained in said second register with the received value of the first register for a corresponding moment in time resynchronize the first and second key streams with one another.

49. A method of communicating with cryptographically encoded data within a digital telecommunications system as set forth in claim 48 which also includes:

incrementing the value contained in said first register at defined intervals to vary the pattern of bits in the first key stream; and incrementing the value contained in said second register at the same intervals as said first register to vary the pattern of bits in the second key stream in an identical fashion to the pattern of bits in the first key stream.

50. A system for communicating with cryptographically encoded data within a digital telecommunications system, comprising:

means for generating a first pseudo-random key stream of bits in accordance with an algorithm which is a function of a multi-bit digital value contained in a first register;

means for combining the bits of the first pseudo-random key stream with a stream of data bits carrying communications information to cryptographically encode said data;

means for transmitting said encoded data to a receiver;

means for transmitting to said receiver at intervals and interspersed with said transmissions of encoded data the value contained in said first register;

means for generating a second pseudo-random key stream of bits in accordance with said algorithm which is a function of a multi-bit digital value contained in a second register;

means for combining the bits of the second pseudo-random key streams with the received stream of cryptographically encoded data to decode said data into said communications information; and means for periodically comparing the value contained in said second register with the received value of the first register to determine whether the two values correspond for corresponding moments of time and whether the first and second key streams are in synchronism with one another.

51. A system for communicating with cryptographically encoded data within a digital telecommunications system as set forth in claim 50 which also includes:

means for resetting the value contained in said second register with the received value of the first register for a corresponding moment in time to resynchronize the first and second key streams with one another.

52. A system for communicating with cryptographically encoded data within a digital telecommunications system as set forth in claim 51 which also includes:

means for incrementing the value contained in said first register at defined intervals to vary the pattrn of bits in the first key stream; and means for incrementing the value contained in said second register at the same intervals as said first register to vary the pattern of bits in the second key stream in an identical fashion to the pattern of bits in the first key stream.

53. A method for duplex communication with cryptographically encoded data within a digital telecommunications system, comprising:

generating at a first location a first pseudo-random key stream of bits in accordance with an algorithm which is a function of a multi-bit digital value contained in a first register;

combining the bits of the first pseudo-random key stream with a stream of data bits carrying communications information to be sent from said first location to a second location to cryptographically encode said data stream and with a stream of cryptographically encoded data stream received from said second location;

transmitting the data stream encoded at said first location to a receiver at said second location;

transmitting to said receiver at said second location at intervals and interspersed with said transmissions of encoded data the value contained in said first register;

generating a second pseudo-random key stream of bits in accordance with said algorithm which is a function of a multi-bit digital value contained in a second register;

combining the bits of the second pseudo-random key stream with the stream of cryptographically encoded data received at said second location to decode said data into said communications information and with a stream of data bits carrying communications information to be sent from said second location to said first location to cryptographically encode said data stream;

transmitting the data stream encoded at the second location to a receiver at the first location;

periodically comparing the value contained in said second register with the received value of the first register to determine whether the two values correspond for corresponding moments of time and whether the first and second key streams are in synchronism with one another.

54. A method of communicating with cryptographically encoded data within a digital telecommunications system as set forth in claim 53 which also includes:
  resetting the value contained in said second register with the received value of the first register for a corresponding moment in time to resynchronize the first and second key streams with one another.

55. A method of communicating with cryptographically encoded data within a digital telecommunications system as set forth in claim 54 which also includes:
  incrementing the value contained in said first register at defined intervals to vary the pattern of bits in the first key stream; and
  incrementing the value contained in said second register at the same intervals as said first register to vary the pattern of its in the second key stream in an identical fashion to the pattern of bits in the first key stream.

56. A system for duplex communication with cryptographically encoded data within a digital telecommunications system, comprising:
  means for generating at a first location a first pseudo-random key stream of bits in accordance with an algorithm which is a function of a multi-bit digital value contained in a first register;
  means for combining the bits of the first pseudo-random key stream with a stream of data bits carrying communications information to be sent from said first location to a second location to cryptographically encode said data stream and with a stream of cryptographically encoded data stream received from said second location;
  means for transmitting the data stream encoded at said first location to a receiver at said second location;
  means for transmitting to said receiver at said second location at intervals and interspersed with said transmissions of encoded data the value contained in said first register;
  means for generating a second pseudo-random key stream of bits in accordance with said algorithm which is a function of a multi-bit digital value contained in a second register;
  means for combining the bits of the second pseudo-random key stream with the stream of cryptographically encoded data received at said second location to decode said data into said communications information and with a stream of data bit carrying communications information to be sent from said second location to said first location to cryptographically encode said data stream;
  means for transmitting the data stream encoded at the second location to a receiver at the first location; and
  means for comparing the value contained in said second register with the received value of the first register to determine whether the two values correspond for corresponding moments of time and whether the first and second key streams are in synchronism with one another.

57. A method of communicating with cryptographically encoded data within a digital telecommunications system as set forth in claim 56 which also includes:
  resetting the value contained in said second register with the received value of the first register for a corresponding moment in time to resynchronize the first and second key streams with one another.

58. A method of communicating with cryptographically encoded data within a digital telecommunications system as set forth in claim 57 which also includes:
  incrementing the value contained in said first register at defined intervals to vary the pattern of bits in the first key stream; and
  incrementing the value contained in said second register at the same intervals as said first register to vary the pattern of bits in the second key stream in an identical fashion to the pattern of bits in the first key stream.

* * * * *

UNITED STATES PATENT AND TRADEMARK OFFICE
CERTIFICATE OF CORRECTION

PATENT NO. : 5,060,266
DATED : Oct. 22, 1991
INVENTOR(S) : Paul Dent

It is certified that error appears in the above-identified patent and that said Letters Patent is hereby corrected as shown below:

```
Column 8, line 51;    delete "/4-DQPSK"
                      insert --π/4-DQPSK--

Column 8, line 51;    delete "(/4"
                      insert --(π/4--

Column 8, line 56;    delete "/4"
                      insert --π/4--

Column 8, line 56;    delete "3/3"
                      insert --3 π/4--

Column 8, line 67;    delete "a an"
                      insert --a--

Column 9, line 5;     delete "/4-DQPSK"
                      insert --π/4-DQPSK--

Column 9, line 16;    delete "the 4"
                      insert --the--

Column 11, line 45;   delete "indentical"
                      insert --identical--

Column 22, line 11;   delete "intervals"
                      insert --interval--

Column 24, line 4;    delete "streams"
                      insert --stream--
```

UNITED STATES PATENT AND TRADEMARK OFFICE
CERTIFICATE OF CORRECTION

PATENT NO. : 5,060,266
DATED : Oct. 22, 1991
INVENTOR(S) : Paul Dent

It is certified that error appears in the above-indentified patent and that said Letters Patent is hereby corrected as shown below:

Column 25, line 20; delete "its" insert --bits--.

Signed and Sealed this

Twenty-second Day of February, 1994

Attest:

BRUCE LEHMAN

Attesting Officer  Commissioner of Patents and Trademarks